United States Patent [19]
Karlsson et al.

[11] Patent Number: 6,034,634
[45] Date of Patent: *Mar. 7, 2000

[54] TERMINAL ANTENNA FOR COMMUNICATIONS SYSTEMS

[75] Inventors: Ingmar Karlsson, Kallered; Magnus Bonnedal, Savedalen; Ulf Jostell, Molndal; Anders Carlstrom; Jean Marc Barraco, both of Gothenburg, all of Sweden

[73] Assignee: Telefonaktiebolaget L M Ericsson (publ), Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,244

[22] Filed: Oct. 24, 1997

[51] Int. Cl.[7] .................................................. G03B 19/00
[52] U.S. Cl. ......................... 342/359; 342/354; 455/12.1
[58] Field of Search ................................... 342/354, 359; 455/12.1

[56] References Cited

U.S. PATENT DOCUMENTS

| | | |
|---|---|---|
| 5,121,503 | 6/1992 | Davis . |
| 5,153,485 | 10/1992 | Yamada et al. ............. 318/35 |
| 5,161,248 | 11/1992 | Bertiger et al. . |
| 5,245,348 | 9/1993 | Nishikawa et al. ........... 342/359 |
| 5,303,286 | 4/1994 | Wiedeman . |
| 5,313,215 | 5/1994 | Walker et al. . |
| 5,355,138 | 10/1994 | Cances et al. . |
| 5,408,237 | 4/1995 | Patterson et al. . |
| 5,486,835 | 1/1996 | Hock ........................... 342/359 |
| 5,612,701 | 3/1997 | Diekelman . |
| 5,621,415 | 4/1997 | Tuck . |
| 5,642,122 | 6/1997 | Lockie et al. . |
| 5,650,788 | 7/1997 | Jha . |
| 5,668,556 | 9/1997 | Rouffet et al. ............... 342/354 |
| 5,751,247 | 5/1998 | Nomoto et al. .............. 342/359 |

Primary Examiner—Mark Hellner
Attorney, Agent, or Firm—Jenkens & Gilchrist, P.C.

[57] ABSTRACT

An inexpensive high gain antenna for use on terminals communicating with low earth orbit (LEO) satellites which include an elevation table mounted for arcuate movement about a transverse axis on an azimuth turntable mounted for rotational movement about a central axis. A plurality of antenna elements forming a phased array antenna are mounted on the top of the elevation table and have a scan plane which is parallel to and extends through the transverse axis of the elevation table. The antenna may be both mechanically and electrically scanned and is used to perform handoffs from one LEO satellite to another by positioning the elevation table of the antenna with its boresight in a direction intermediate the two satellites and with the scan plane of the antenna passing through both satellites. At the moment of of handoff, the antenna beam is electronically scanned from one satellite to another without any loss in data communication during the process.

31 Claims, 4 Drawing Sheets

TERMINAL ANTENNA FOR COMMUNICATIONS SYSTEMS

BACKGROUND OF THE INVENTION

1. Field of the Invention

The invention relates to terminal antennas for use in telecommunications systems and, more particularly, to an antenna adapted for communication with low earth orbit (LEO) satellite systems.

2. Description of the Related Art

Satellite radio communication has been in existence now for many years. Initially such satellites were designed to route communications from one point on the earth to the other, principally for long distance telephone calls and television signals. For example, the "Early Bird" satellite linked two stations on either side of the Atlantic ocean and enabled the first practical live television coverage of events on opposite sides of the Atlantic. These early satellites were located in geosynchronous orbits and their communication linkages were comparatively low frequency (and thus long wavelength) and required relatively large diameter dish shaped receiving antennas at each earth station.

In general, communication satellites fall in three categories. The first are known as geosynchronous earth orbit (GEO) satellites, which are positioned in orbit at a point approximately 22,000 miles above the earth so they appear to remain "stationary" over the same point on the earth. All the earliest satellites were of this type. The second type of communication satellites are called medium earth orbit (MEO) satellites which are proposed to orbit the earth at a distance of about 8,000 miles. This shorter distance from the earth to the satellite reduces the transmission delay of signals so that real time communication with such satellites is much more practical. For example, a GEO satellite requires approximately 0.25 seconds for a round trip from an earth station to the satellite and back again while an MEO satellite requires less than 0.1 seconds to complete the same circuit. The third type of satellites which are currently being proposed are referred to as low earth orbit (LEO) satellites. These LEO satellites will orbit the earth at a distance of only 500 to 1,000 miles above the earth providing a relatively short distance for the radio signal to travel between an earth terminal and a satellite and thereby reducing the transmission delay to on the order of 0.05 seconds making real time voice and data communications much more practical. In addition, the short distance between earth stations and the satellite reduces the need for sensitive and bulky receiving equipment. Modern satellite constellation systems such as that currently being proposed by a U.S. partnership of companies and referred to as "Teledesic" incorporates such LEO satellites.

The preferred LEO communication satellite constellations are cellular in nature and intended to handle large amounts of data including high speed mobile internet access as well as high speed business data communications. Such large data throughput requires a very large amount of bandwidth in the communication link. In order to obtain this bandwidth these systems will need to operate at relatively high frequencies, for example, in the Ku and Ka bands, and employ frequencies on the order of 12–30 $GH_z$. It is well known that the higher the frequency of operation of a satellite system the narrower the beam which is available for efficient use by the satellite antenna. Thus, in such systems it is very important to precisely control the receiving/transmitting antenna.

With lower frequency satellite communication, for example in the range of a few gigahertz, a mobile station communicating with a satellite may employ a simple linear antenna structure and communicate with sufficient efficiency that the desired goals are accomplished. However, for very high frequency communications scanning antennas are necessary in each mobile station in order to be able to capture the rapidly moving satellite and achieve efficient communication. The incorporation of such antennas into a mobile station involve a number of technical obstacles.

One characteristic of LEO satellite systems is that due to the apparent movement of each satellite across the sky, the time period during which a mobile station may engage in communication with each particular satellite is relatively short and requires special consideration. For example, a mobile station must be able to establish a communication link with the satellite immediately when it comes over the horizon and is electronically visible to the mobile station and then track that satellite as it passes overhead and disappears over the other horizon. Prior to the disappearance of the "going" satellite, the antenna of the mobile station must be able to establish communication with a "coming" satellite so that there is an effective "handoff" of the communication link from the going satellite to the coming satellite while the communication link with both satellites is still good. One solution to this problem is to provide each mobile station with two antennas. One to track the going satellite across the sky until it disappears and a second antenna to be ready for the appearance of the coming satellite so that there is never any break in the communication link when the handoff from one satellite to the other occurs. Needless to say, multiple antennas for each terminal is both bulky and expensive.

Another solution to the problem of LEO satellite communication is the antenna shown in U.S. Pat. No. 5,650,788 entitled "Terrestrial Antennas for Satellite Communication System" issued Jul. 22, 1997 to Jha and assigned to Teledesic Corporation. This antenna is a hemispherical phased array antenna which is electronically scanned. However, to achieve the high gain which is necessary to handle the large data rates proposed, the antenna must have a large number of phase controlled elements and, thus, be relatively expensive.

Still another solution to the LEO satellite handoff problem would be to provide a very high speed mechanical scanning mechanism on an antenna of fewer elements so that immediately prior to the disappearance of the going satellite, the antenna could be rotated and locked onto the beam of the coming satellite without any interruption in the data stream. However, with very high frequencies and rapidly moving LEO satellites this would require mechanical movements of the antenna system at a speed and precision far in excess of that which mechanical adjustment mechanisms controlled by current technology are capable.

There exists a need for a relatively inexpensive high gain antenna system for a mobile station communicating with LEO satellites which has the capability of compensating for both movements of the mobile station as well as movements of the satellite and of being scanned at a sufficiently high rate to avoid any loss of data communications when being handed off from a going LEO satellite to a coming LEO satellite. The system of the present invention fulfills such needs.

BRIEF SUMMARY OF THE INVENTION

In one aspect, the present invention includes an antenna for communication with at least two communications nodes and which has an azimuth turntable mounted for rotational motion in either direction about a central axis. An elevation table is mounted upon the azimuth turntable for arcuate movement about a transverse axis which is perpendicular to the central axis. The upper surface of the table contains a plurality of antenna elements to form a phased array antenna in which the scan plane of the phased array lies in a plane which is parallel to and preferably passes through the transverse axis. The azimuth turntable is rotated about the central axis and the elevation table is arcuately moved about the transverse axis until the phased array antenna elements mounted upon the elevation table are positioned so that two of the nodes with which the antenna is to communicate lie within the scan plane of the antenna elements. The beam of the phased array antenna elements mounted upon the elevation table is electronically scanned to be selectively directed to either one or the other of the two nodes.

In one embodiment of this aspect, one of the at least two nodes is a going satellite of a constellation and the other of the nodes is a coming satellite of the constellation and the antenna is used to perform a handoff of the communication channel from the going to the coming satellite. In this embodiment, the azimuth turntable of the antenna is rotated about the central axis and the elevation table is arcuately moved about the transverse axis until the phased array antenna elements mounted upon the elevation table are positioned so that the positions of the going and coming satellites at the moment of handoff lie within the scan plane of the antenna elements and the boresight of the antenna elements points in a direction intermediate the position of the two satellites. The beam of the phased array antenna elements mounted upon the elevation table is electronically scanned from the going satellite to the coming satellite at the moment of handoff.

In another aspect, the invention relates to performing handoff of a communication signal between a first low earth orbit (LEO) satellite and a second LEO satellite with an antenna in which the beam thereof may be both physically scanned by moving the antenna and electronically scanned by changing the phase relationship between the antenna elements. The antenna has a scan plane directed outwardly from the surface thereof within which the antenna beam is electronically scannable. Communication is established with a first LEO satellite and the satellite is tracked with the beam of the antenna as it moves in its orbit with either mechanical movement of the antenna or electronic scanning of the beam or a combination thereof. The location at which the second satellite will appear at handoff is anticipated and the antenna is physically positioned prior to handoff so that both the first satellite and the anticipated location of the second satellite lie within the scan plane of the antenna. The beam of the antenna is electronically scanned from the first satellite to the second satellite to de-establish communication with the first and establish communication with the second at the moment of handoff.

In yet another aspect, the invention includes performing handoff of a terminal from one satellite to another by an antenna which is capable of being both mechanically and electronically scanned. A first satellite is tracked with boresight pointing of the antenna by mechanical and/or electronic scanning of the antenna to follow the satellite. Information from the satellite is received as to next handoff time and the position of a second satellite at that handoff time. The position of the first satellite at the handoff time is calculated and predicted. A first vector is calculated from the antenna to the first satellite at handoff time and a second vector is calculated from the antenna to the second satellite at handoff time. The antenna is mechanically positioned so that both of the calculated vectors lie upon the electronic scan plane of the antenna just prior to the handoff and then the beam of the antenna is scanning electronically from said first satellite to the second satellite at handoff time to establish communication with the second satellite. Thereafter, the second satellite is tracked with boresight pointing using mechanical and/of electronic scanning of the antenna.

BRIEF DESCRIPTION OF THE DRAWINGS

For an understanding of the present invention and for further objects and advantages thereof, reference can now be had to the following description, taken in conjunction with the accompanying drawings in which.

DETAILED DESCRIPTION OF THE PREFERRED EMBODIMENT

Virtually all antennas are directional and transmit or receive more power in some directions than in others. The direction of maximum transmission or reception is called the "RF boresight direction" of the antenna. The directional properties of an antenna are described by the radiation pattern of that antenna which is a pictorial representation of its relative radiated power versus direction. Radiation patterns also exhibit a lobe structure in which the largest lobe in three-dimensional space constitutes the "beam" through which the antenna radiates and/or receives most of its power.

Electromagnetic waves are vector quantities, that is, they are polarized. The preferred (desired) polarization radiated by an antenna is termed co-polarization while the orthogonal polarization is called cross-polarization.

One technique of following the narrow beam of a satellite is to physically scan the antenna, i.e. mechanically point the antenna so that its beam stays in alignment with the signal from the satellite. An alternative approach is to form the antenna of many small antennas deployed over a large area and connect them in such a way that their received or transmitted signals are in a correct electrical relationship (phase) with each other to form a "phased array." Each individual antenna in the array is called an "element." Moving the beam of an antenna in a particular direction is called "scanning." While one way of scanning an antenna is by mechanically moving the antenna, a phased array antenna can be electrically scanned by changing the phasing of its elements. The antenna of the present invention can be scanned by both techniques. The direction of the beam when no electrical scanning is applied is called "mechanical boresight" or simple "boresight." A further alternative concept is to use a phased array as a feed in a reflector antenna.

As described above, LEO satellites have certain characteristics which render communication with them very different from the traditional GEO satellites or even the MEO satellites which have been proposed. For example, their apparent movement across the sky is very rapid and requires an antenna on an earth based terminal to operate very quickly to keep up with the satellite in order to maintain reliable communication with it. In the event the mobile station is itself moving across the surface of the earth this makes the problem of controlling the antenna even more difficult.

Antennas that communicate with satellites which have apparent movement across the earth's surface must be scanned in order to move their beam and maintain good communication with that satellite. As discussed above, this scanning can be either mechanical scanning in which the various axes of the antenna are moved in a rotational and arcuate path in order to maintain the beam, i.e., the central lobe of sensitivity of the antenna, in direct alignment with the communication beam to and from the satellite or electronic scanning by changing the phase relationship of the different antenna elements. For certain very high speed data applications such as internet communications, very high operating frequencies are required in order to obtain sufficient bandwidth to achieve these high data throughput goals. Very high operating frequencies, for example in the Ka band on the order of 20–30 $GH_z$, define a circumstance in which the communication beam to and from the satellite is very narrow. That is, the "zone of sensitivity" is a very small value, for example, on the order of 2 degrees or less. This requires that the beam of the antenna be continually repositioned very precisely in alignment with the direction of the satellite in order to have a high degree of communication effectiveness with the satellite.

While the antenna system of the present invention is described below in the context of a preferred application of a terminal antenna for use in connection with low earth orbit satellite communications it should be understood that the antenna system has advantageous characteristics which can be employed in a number of different communications applications. For example, the antenna system may be used for: (1) fixed or mobile ground terminals and nodes on satellites, airplanes and UAV; (2) terminals on airplanes, UAV and nodes on satellites; and (3) a terminal on one satellite and nodes on others. The antenna system of the present invention advantageously enables a terminal to be able to switch between two or more different nodes or to communicate with two or more nodes at the same time, particularly in the case wherein the terminal and the nodes are moving with respect to one another.

Figure 1:
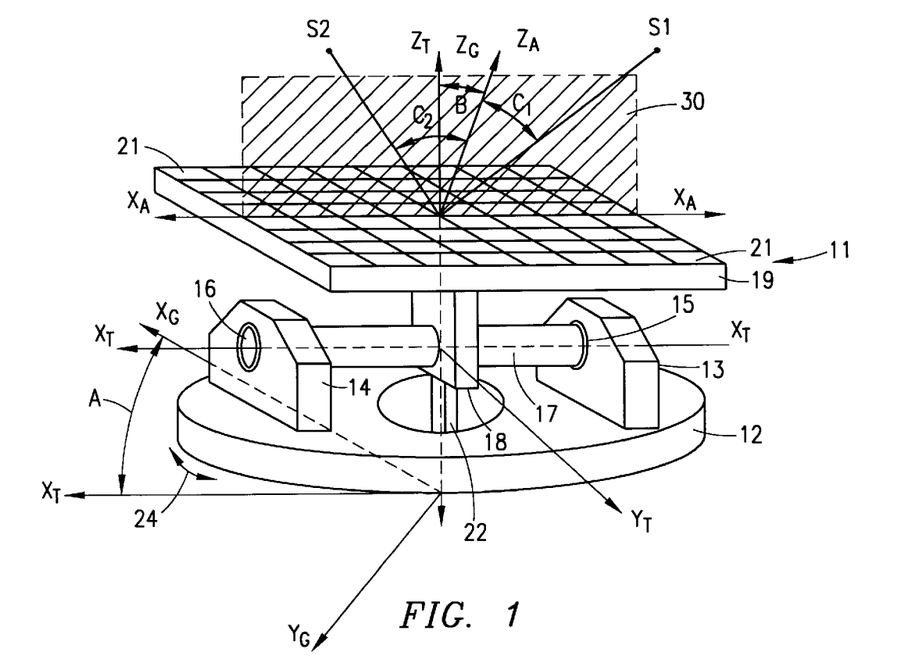
FIG. 1 is a perspective view of a terminal antenna which is both electrically and mechanically scanned for use in communication with satellite systems in accordance with the present invention.

Referring first to FIG. 1, there is shown an antenna structure of the type incorporated into the system of the present invention. The antenna 11 incorporates an azimuth turntable 12 upon which a pair of spaced apart upstanding bearing plates 13 and 14 are mounted. Each bearing plate 13 and 14 mounts, respectively, a bearing 15 and 16. A mounting shaft 17 is journaled for rotation at opposite ends within the bearings 15 and 16, respectively and has an upstanding mounting plate 18 rigidly affixed to its central portion. Mounted on top of and rigidly fixed to the mounting plate 18 is an elevation table 19. The upper surface of the elevation table 19 contains a plurality of antenna elements 21 mounted in a grid-like array and electrically connected into a phased array antenna. A signal coupler 22 is connected from the receiving and transmitting circuitry of the system (not shown) through the upstanding plate 18 and the elevation table 19 into the plurality of elements 21 for both transmitting radio signals from the antenna arrays 21 to a satellite as well as receiving signals from a satellite.

A fixed ground coordinate system is defined by the reference coordinates $X_g/Y_g/Z_g$. The azimuth turntable 12 may be rotated in both directions about the $Z_g$ axis in the $X_g-Y_g$ plane. That is, the azimuth turntable 12 may be rotated in either of the two directions represented by the arc 24. The elevation table 19 is positioned on the azimuth turntable 12 and lies within the coordinate system $X_t/Y_t/Z_t$. The rotational mounting shaft 17 allows the elevation table 19 to be rotated about the axis $X_t$ so that all points on the upper surface of the elevation table 19 move arcuately within planes parallel to the plane defined by $Y_t/Z_t$. An antenna coordinate system $X_a/Y_a/Z_a$ is defined fixed to the radiating surface. $Z_a$ is aligned with the mechanical boresight and $X_a$ is parallel to $X_t$.

As described briefly above, all antennas have a radiation pattern which exhibits a lobe structure wherein the largest lobe in three dimensional space constitutes the beam through which the antenna radiates and/or receives most of its power. In general, the locus of half-power points surrounding the peak signal level is taken to be the perimeter of the main beam of the antenna. The process of moving the beam of an antenna in order to track a satellite, for example, is referred to as scanning. The beam of a phased array antenna may be scanned by either mechanically moving the beam by moving the physical orientation of the elements 21 of the antenna or by electronically scanning the beam by changing the phase relationship between each of the antenna elements 21. In the antenna of the present invention, the frequency of the radio signal which it handles in order to communicate with the LEO satellites is very high, on the order of 20–30 $GH_z$ in the range of the Ka band. The beam of the antenna of the present invention may be scanned by both mechanically rotating the azimuth table 12 and moving the elevation table 19 in order to change the orientation of the antenna arrays 21 with respect to a moving satellite and by electronic scanning of the antenna elements 21 by changing their relative phase relationship.

Figure 2:
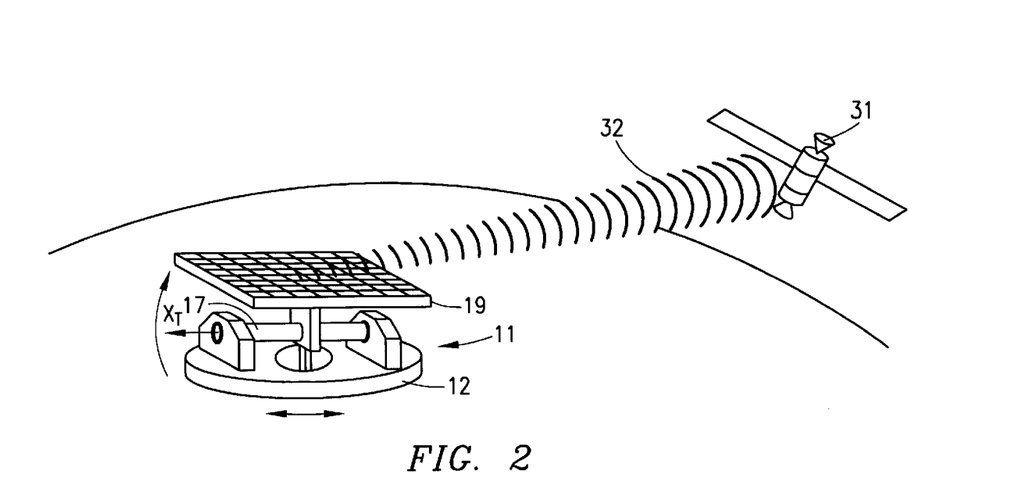
FIG. 2 is a pictorial diagram illustrating the positioning of the antenna of FIG. 1 to establish communication with a "coming" LEO satellite.

Referring next to FIG. 2, the antenna of the present invention 11 is shown in data communication with an LEO satellite 31 which is just coming into view of the antenna 11 over the horizon. Such a satellite which is just coming into view is referred to as a "coming" satellite. In FIG. 2 it is illustrated how the azimuth table 12 and the elevation table 19 may be positioned with respect to the satellite 31 and the beam 32 of the antenna 11 electronically scanned in order to direct the beam at the satellite 31. The electronic scan plane 30 of the antenna 11 (FIG. 1) of the present invention is the plane which is substantially normal to the upper surface of the elevation table 19 and substantially parallel to a plane within which the axes $Z_a$ and $X_a$ lie. The closer the scan plane 30 is to being parallel to the transverse axis $X_a$ of the mounting shaft 17, the better will be the results. The beam of the antenna may be electronically scanned through a certain angular range within this scan plane 30. Thus, as shown in FIG. 2, the beam of the antenna may be continually repositioned as the satellite 31 passes over the antenna 11 so that the beam is continuously directed at the satellite. This scanning may be performed by either electronic scanning or mechanical scanning by rotation of the azimuth turntable 12 and angular movement of the elevation table 19 about the $X_t$ axis passing through the mounting rod 17 or a combination of both in order to keep the beam continuously directed at the satellite 31 as it passes overhead. Preferably, but not necessarily, the boresight of the antenna 11 is pointed directly at the satellite with which it is in communication the majority of the time in order to maximize the effectiveness therebetween. The principal occasions on which the antenna 11 relies upon electronic scanning to direct the beam of the antenna toward the satellite(s) is just before, during and just after a handoff ("HO") of the communication from one satellite to another, as described below.

Figure 3:
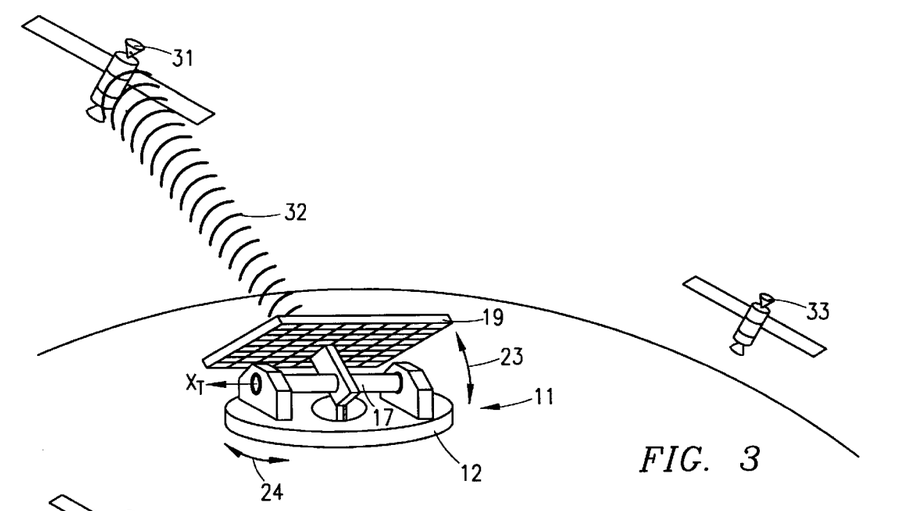
FIG. 3 is a pictorial diagram illustrating the antenna of the present invention in communication with a "going" LEO satellite as it nears the horizon.

Referring next to FIG. 3, there is shown how the antenna 11 is continued to be scanned by both mechanical and electrical scanning to maintain the beam 32 directed at the satellite 31 as it changes from being a "coming" satellite to be being a "going" satellite. As illustrated in FIG. 3, the satellite 31 is just preparing to pass out of view of the antenna 11 over the far horizon and another "coming" satellite 33 is just coming into view over the near horizon. This point illustrated generally in FIG. 3, that is, the point at which a going satellite is disappearing from view and a "coming" satellite is coming into view is a very important one from the standpoint of "handoff" of the satellite communications from one satellite to another. The handoff must be performed extremely quickly so that there is essentially no loss of data communication in the transition of moving the beam of the antenna 11 from one satellite to another. In the system of the present invention, this is accomplished by having the antenna 11 be positioned with respect to the going satellite 31 so that the beam 32 is still in communication with that satellite while the scan plane of the antenna 11 is positioned so that the coming satellite 33 also lies within that scan plane. Preferably, but not necessarily, the boresight of antenna 11 is physically scanned to a positioning vector intermediate the vectors defining the respective positions of the going and coming satellites at the moment of handoff. The antenna is preferably physically pointed to this position immediately prior to handoff. The important point is that both the going and coming satellites should lie within the electronic scan plane 30 of the antenna 11 at the instant of handoff so that purely electronic scanning can be used to effect the handoff.

The circuitry of the radio communications system of which the antenna 11 forms a part, is told by a beacon signal from the satellite system the precise position at which the next coming satellite will appear on the horizon, This knowledge is based upon the regularity with which the movement of the satellites comprising a constellation of LEO satellites move above the surface of the earth. Thus, the antenna 11 can be mechanically moved by a rotational direction 24 as well as an elevational direction 23 so that the scan plane 30 of the elevation table 19 contains both the going satellite 31 and the coming satellite 33. At the appointed time of handoff, an instant in time at which a coming satellite is clearly in sufficient view to provide good communication with the antenna and the going satellite 31 is still sufficiently visible for reliable communication, the antenna 11 is electronically scanned through the scan plane 30 to move the antenna beam 32 from the going satellite 31 to the coming satellite 33. The scanning at this point is essentially all electronic in that the time period for breaking the communication with the going satellite 31 and making the communication with the satellite 33 must be so short that essentially no data communication is lost.

Figures 4, 5:
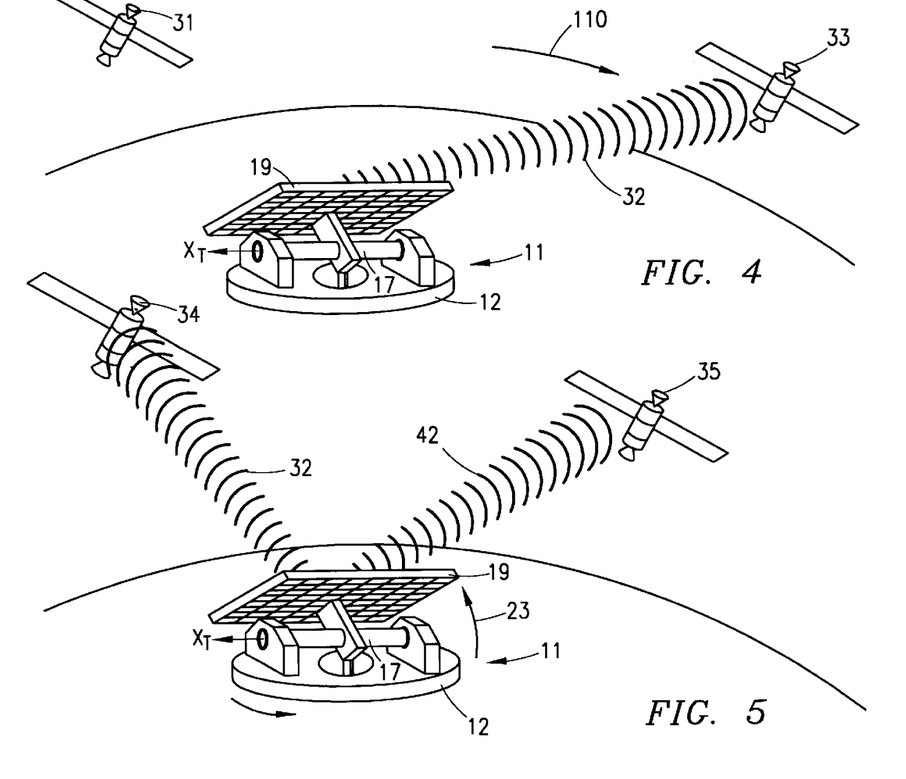
FIG. 4 is a pictorial diagram of the antenna of the present invention illustrating the data communications stream being handed off from a going satellite to a coming satellite by electronic scanning.
FIG. 5 is a pictorial diagram of the antenna of the present invention operated in an alternative mode to achieve data communication with two separate satellites at the same time.

As illustrated in FIG. 4, this transition by electronically scanning the beam 32 of the antenna 11 through an arc 40 lying within the scan plane 30 of the antenna can be performed sufficiently fast that no communication suffers.

Thereafter, the beam 32 may be scanned in order to track the satellite 33 as it moves across the sky by both mechanical movement of the antenna 11 as well as electronic movement of the beam 32 through the scan plane. As mentioned above, the antenna 11 is preferably, but not necessarily, mechanically repositioned so that the boresight of the antenna is in alignment with the satellite with which it is in communication.

In antennas of the type shown in FIG. 1, circular polarization is assumed. If the antenna array is radiating and/or transmitting in linear polarization, the array must be able to rotate the linear polarization in order to maintain the global linear polarization during scan plane rotation.

With a single electrically steered beam of the type illustrated in FIGS. 2–4, instantaneous switch over between communication with two satellites can be achieved with virtually no loss in data. In addition, if RF tracking along the scan plane is employed, RF tracking in the orthogonal plane is achieved by simply rotating the scan plane by 90 degrees. Further, rotation of the scan plane 30 in addition to electronic scanning can be used to improve the signal to interference ratio since the side lobe and cross polarization patterns are rotated along with the scan plan.

A second embodiment of the present invention is illustrated in FIG. 5, is that in which two independent electrically controlled beams 32 and 42 are used to communicate simultaneously between two satellites 34 and 35. This is accomplished by equipping the system with two sets of feed networks and two sets of RF electronics and then steering the azimuth turntable 19 of the antenna 11 so that the antenna scan plane 30 coincides with the plane spanned by the antenna 11 and both of the satellites 34 and 35. This is an additional feature of electronic scanning of two independent beams within the single scan plane 30 of the antenna 11 of the present invention.

Figure 6:
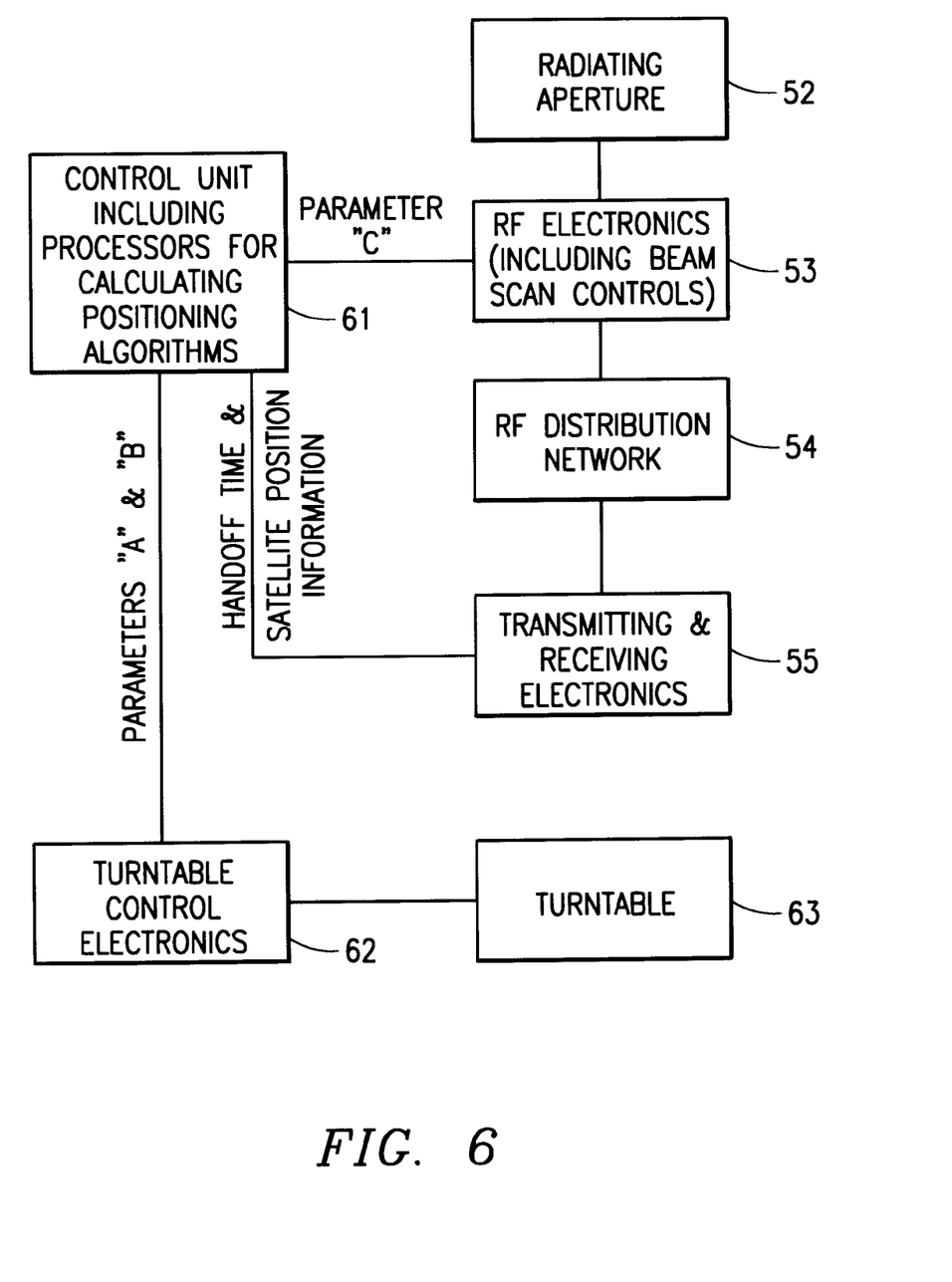
FIG. 6 is a block diagram illustrating certain components of the system of the present invention.

Referring next to FIG. 6, there is shown a block diagram illustrating both the control and signaling elements of the antenna of the present invention. The antenna contains a radiating aperture 52 which is electronically connected to RF electronics 53. The RF electronics 53 include the beam scan controls for the phased array antenna incorporated in the present invention as well as the other electronics necessary to provide an RF signal to a distribution network 54. The RF distribution network 54 is connected to the transmitting and receiving electronics 55.

The RF electronics 53 are also connected to a control unit 61 which includes all of the processors and other elements necessary for calculating and using various positioning algorithms to control the mechanical and electronic scanning of the antenna of the present invention. For example, one output of the control unit 61 includes a parameter "C" which indicates the scan angle to which the phased array should currently be positioned.

The control unit 61 is also connected to turntable control electronic 62 and produces parameters "A" and "B" which define the physical angular positioning of the antenna and enable the control electronic 62 to turn the turntable 63 and physically position the antenna in the desired position in accordance with the present invention. The RF signal from the satellite contains a beacon signal which includes periodically sent information defining the precise handoff (HO) time as well as the exact position of the coming satellite (S2) at the moment of handoff. This information is sent to the control unit 61 for processing as described below.

Figure 7:
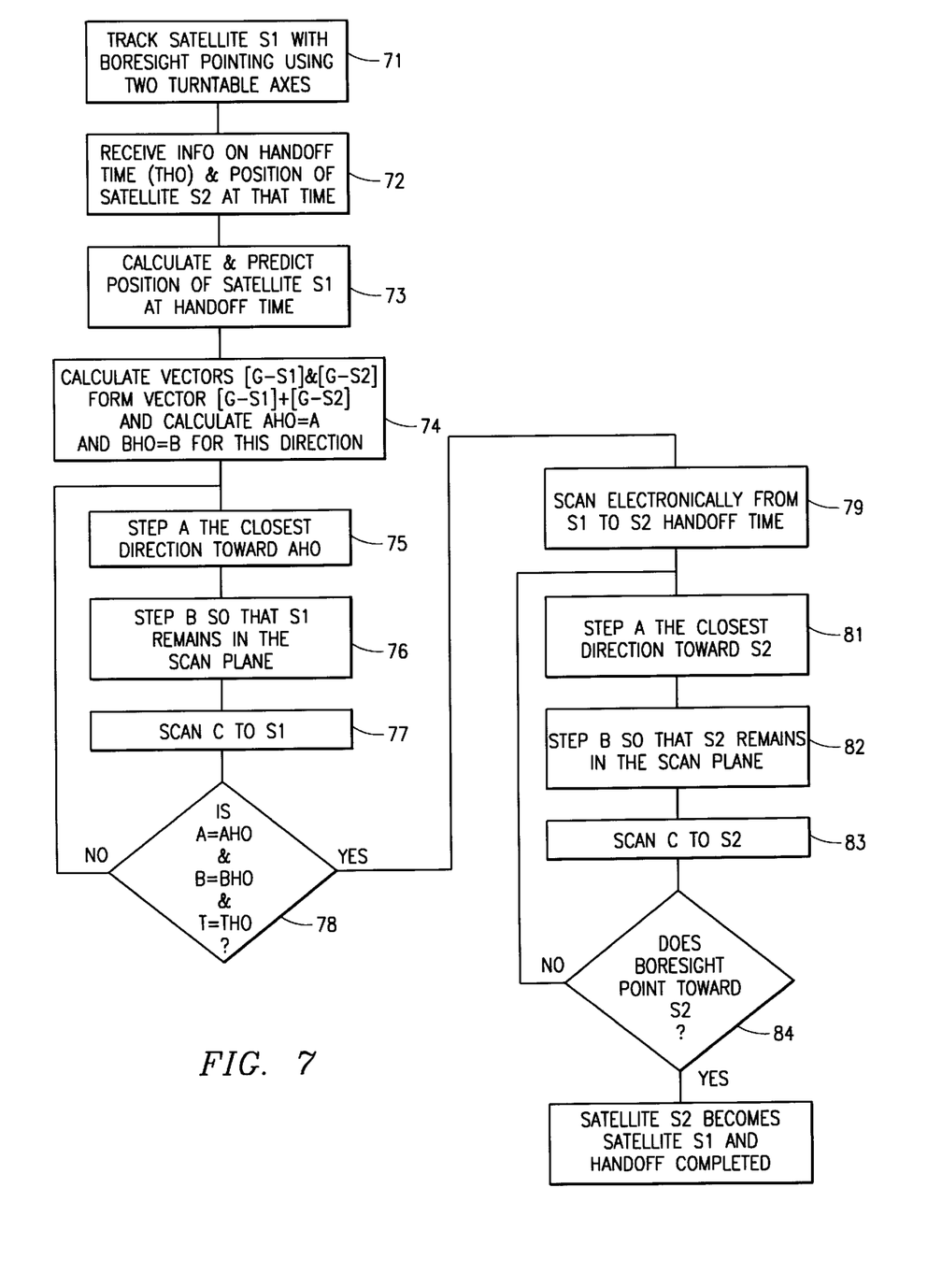
FIG. 7 is a flow chart illustrating certain aspects of the method incorporated in the present invention.

Referring next to FIG. 7, there is shown a flow chart describing one manner in which the antenna system may operate in accordance with the method of the present invention. At 71 the system tracks a going satellite (S1) with boresight pointing using the two turntable axes of the antenna of the present invention. At 72 it receives information from the satellite with respect to the precise handoff time and position of the coming satellite (S2) at the instant of handoff. The system takes the data received from the satellite S1 on a beacon signal and uses it to calculate and predict the position of the going satellite S1 at the time of handoff. Next, at 74 the system calculates the vectors [G-S1] and [G-S2], that is, the two vector coordinates from the antenna 11 of each of the respective going and coming satellites (S1 and S2) at the moment of handoff. In addition, at 74 the system calculates a vector [G-S1]+[G-S2] which is an intermediate position vector directed between the satellites S1 and S2 at the moment of handoff but in which both satellites S1 and S2 and the intermediate vector lie within the scan plane 30 of the antenna 11. Next, still at 74, the system calculates AHO=A and BHO=B for the intermediate position vector just calculated. These parameters are the two angles, respectively, through which the azimuth turntable 12 and the elevation table 19 must be moved from their respective reference positions in order to be pointing in the direction of the intermediate vector at the moment of handoff. The two angles C1 and C2 are the angular deviations from the boresight direction of the antenna which the beam of the antenna must move to be directed towards the two satellites S1 and S2. When the antenna is positioned in the direction of the intermediate vector, C1=C2. Pointing the boresight of the antenna in the direction of the intermediate vector [G-S1]+[G-S2] maximizes the available scan angle through which the antenna may be electronically scanned at handoff.

Next, at 75 the system begins to step the azimuth turntable 12 in the angular direction A in the closest direction toward AHO. At 76 the system steps the elevation table 19 in angular direction B so that S1 remains in the scan plane. At 77 the system moves the antenna beam so that the scan angle C keeps the beam continuously pointed toward satellite S1. These three steps 75–77 are iteratively performed so that the beam of the antenna remains continuously in alignment with the signal from the satellite during the mechanical movement of the antenna. At 78 the system asks whether or not A is equal to AHO and B equal to BHO and time is equal to THO (the handoff time). If not, the system repeatedly returns to 75 and moves through the series of steps 75–77 until at 78 the antenna is properly positioned so that the antenna is physically pointed in the direction of the intermediate vector [G-S1]+[G-S2] and the answer is yes. At this time the antenna is pointing toward the intermediate vector and the vectors [G-S1] and [G-S2] define the locations of both the satellites at the moment of handoff and lie within the electronic scan plane 30 of the antenna 11. Thereafter, at 79 the system electronically scans the beam of the antenna at the instant of handoff from S1 (going satellite) to S2 (coming satellite). Next, at 81 the system steps the azimuth turntable 12 in the angular direction A in the closest direction toward S2; moves to 82 where the system steps the elevation table 19 in the angular direction B so that S2 remains in the scan plane 30; and moves to 83 where the system scans the antenna beam through angle C so that it continues to point towards S2. These three steps 81–83 are also iteratively performed so that the beam of the antenna 11 remains in proper alignment with the signal from the satellite S2. At 84, the system ask whether or not the boresight of the antenna points toward S2. If not, the system returns to 81 and continues to repeatedly cycle through the sequence of steps 81–83 until the answer at 84 is yes. Thereafter, the satellite S2 becomes satellite S1 and the handoff has been completed.

It should be noted that the system of the present invention preferably, though not necessarily, maintains the antenna 11 in boresight alignment with the satellite within which it is in communication for preferably as long a time as possible. This enables the most efficient communication to and from the satellite. The handoff procedures set forth in the flow chart of FIG. 7 are preferably performed at the latest moment prior to the moment of handoff which is determined by the time required to position the antenna into the intermediate position between the going and coming satellites and then electronically scan from one to the other at the moment of handoff. This technique is preferred, though not essential, in order to ensure the maximum accuracy in data communication with the satellite for as long a period as possible.

Although preferred embodiments of the method and apparatus of the present invention have been illustrated in the accompanying drawings and described in the foregoing description, it is understood that the invention is not limited to the embodiment(s) disclosed but is capable of numerous rearrangements, modifications and substitutions without departing from the spirit of the invention as set forth and defined in the following claims.

What is claimed is:

1. An antenna for communication with at least two nodes comprising:

an azimuth turntable mounted for rotational motion in either direction about a central axis;

an elevation table mounted upon said azimuth turntable for arcuate movement about a transverse axis which is perpendicular to said central axis, said upper surface of said table containing a plurality of antenna elements to form a phased array antenna in which the scan plane of said phased array lies in a plane which is substantially parallel to said transverse axis;

means for rotating said azimuth turntable about said central axis and arcuately moving said elevation table about said transverse axis until said phased array antenna elements mounted upon said elevation table are positioned so that two of said nodes with which said antenna is to communicate lie within the scan plane of said antenna elements; and means for electronically scanning the beam of the phased array antenna elements mounted upon said elevation table to be selectively directed to either one or the other of said two nodes.

2. An antenna for communication with at least two nodes as set forth in claim 1 wherein, one of said at least two nodes is a going satellite of a constellation and the other of said nodes is a coming satellite of said constellation and said antenna is used to perform a handoff of the communication channel from said going to said coming satellite, said antenna further comprising:

means for rotating said azimuth turntable about said central axis and arcuately moving said elevation table about said transverse axis until said phased array antenna elements mounted upon said elevation table are positioned so that the respective positions of said going and coming satellites at the moment of handoff lie within the scan plane of said antenna elements and the boresight of said antenna elements points in a direction intermediate the position of said two satellites; and means for electronically scanning the beam of the phased array antenna elements mounted upon said elevation table from said going satellite to said coming satellite at the moment of handoff.

3. An antenna for communication with at least two nodes as set forth in claim 1 wherein said antenna includes two sets of feed networks and two sets of electronics controlling two independent antenna beams, said antenna further comprising:

means for electronically scanning each of said two independent beams of the phased array antenna elements mounted upon said elevation table to follow separate ones of said two nodes.

4. An antenna for communication with at least two nodes as set forth in claim 1 wherein, one of said at least two nodes is a going satellite of a constellation and the other of said nodes is a coming satellite of said constellation and said antenna is used to perform a handoff of the communication channel from said going to said coming satellite, said antenna further comprising:

a control unit for receiving handoff information from said going satellite indicating the time at which handoff is to be performed and the location of the coming satellite at the moment of handoff;

processor means for calculating from said handoff information the vector direction from said antenna to said going satellite at the moment of handoff and the vector direction of said coming satellite at the moment of handoff;

means for rotating said azimuth turntable about said central axis and arcuately moving said elevation table about said transverse axis until said phased array antenna elements mounted upon said elevation table are positioned so that the vector directions both said going and coming satellites at the moment of handoff lie within the scan plane of said antenna elements and the boresight of said antenna elements points in a direction intermediate the position of said two satellites; and means for electronically scanning the beam of the phased array antenna elements mounted upon said elevation table from said going satellite to said coming satellite at the moment of handoff.

5. An antenna for communication with at least two satellites as set forth in claim 4 wherein, one of said at least two satellites is a going satellite of a constellation and the other of said satellites is a coming satellite of said constellation and said antenna is used to perform a handoff of the communication channel from said going to said coming satellite, and wherein:

said processor means calculates from the vector direction from said antenna to said going satellite at the moment of handoff and the vector direction to said coming satellite at the moment of handoff, an intermediate vector direction which the sum of the two said vector directions;

said means for rotating said azimuth turntable about said central axis and arcuately moving said elevation table about said transverse axis until said phased array antenna elements mounted upon said elevation table are positioned so that the boresight of said antenna elements points in the direction of said calculated intermediate vector just prior to electronically scanning said antenna beam from said going satellite to said coming satellite.

6. An antenna for communication with at least two satellites as set forth in claim 4 which also includes:

means for rotating said azimuth turntable about said central axis and arcuately moving said elevation table about said transverse axis immediately after handoff so that the boresight of said antenna elements points in a direction directly in alignment with said coming satellite to which the communication channel has just been handed off.

7. An antenna for communication with two low earth orbit satellites comprising:

an azimuth turntable mounted for rotational motion in either direction about a central axis;

an elevation table mounted upon said azimuth turntable for arcuate movement about a transverse axis which is perpendicular to said central axis, said upper surface of said table containing a plurality of antenna elements to form a phased array antenna in which the scan plane of said phased array lies in a plane which is substantially parallel to said transverse axis;

two sets of feed networks to said antenna elements and two sets of scan electronics connected to said antenna elements to define two independent beams for said antenna;

means for rotating said azimuth turntable about said central axis and arcuately moving said elevation table about said transverse axis until said phased array antenna elements mounted upon said elevation table are positioned so that said two satellites with which said antenna is to communicate lie within the scan plane of said antenna elements; and means for independently electronically scanning the each of said two independent beams of the phased array antenna elements mounted upon said elevation table to be directed toward each of said two satellites.

8. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements, said antenna having a scan plane directed outwardly from the surface thereof within which said antenna beam is electronically scannable, said method comprising:

establishing communication with a first LEO satellite and tracking said satellite with the beam of said antenna as it moves in its orbit with either mechanical movement of the antenna or electronic scanning of the beam or a combination thereof;

anticipating the location of said second satellite at the time of handoff;

physically positioning the antenna prior to the said handoff so that both said first satellite and the anticipated location of the second satellite lie within the scan plane of the antenna; and electronically scanning the beam of the antenna from said first satellite to said second satellite at said time of handoff to de-establish communication with the first satellite and establish communication with the second satellite.

9. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 8, which includes the additional step of:

receiving handoff information from said first satellite specifying the time at which handoff from the first to the second satellite will occur and the location of said second satellite at the time of handoff;

calculating the position of said first satellite at the time of handoff; and said step of physically positioning the antenna prior to said handoff includes positioning the antenna so that both said calculated position of said first satellite and the location of the second satellite at the time of handoff lie within the scan plane of the antenna.

10. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 9, which includes the additional step of:

calculating from the received handoff information the vector direction from the antenna to the first satellite at the time of handoff and the vector direction to the second satellite at the time of handoff; and said step of physically positioning the antenna prior to said handoff includes positioning the antenna so that both said vector directions of said first and second satellites at the time of handoff lie within the scan plane of the antenna.

11. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 10, which includes the additional step of:

calculating from the vector direction from the antenna to the first satellite at the time of handoff and the vector direction to the second satellite at the time of handoff an intermediate vector direction comprising the sum of the other two vector directions; and said step of physically positioning the antenna prior to said handoff includes positioning the antenna so that both said vector directions of said first and second satellites at the time of handoff lie within the scan plane of the antenna and the boresight of the antenna points in the direction of said intermediate vector.

12. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 11, which includes the additional step of:

physically positioning the antenna just after the handoff to the second satellite so that the antenna boresight is in direct alignment with the second satellite.

13. A method of performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 11, wherein:

said step of physically positioning the antenna prior to said handoff includes incremental and iterative movements of the antenna about each of a central rotational axis and a transverse tilting axis and the electronic scanning of the antenna beam.

14. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements, said antenna having a scan plane directed outwardly from the surface thereof within which said antenna beam is electronically scannable, said system comprising:

means for establishing communication with a first LEO satellite and tracking said satellite with the beam of said antenna as it moves in its orbit with either mechanical movement of the antenna or electronic scanning of the beam or a combination thereof;

means for anticipating the location of said second satellite at the time of handoff;

means for physically positioning the antenna prior to said handoff so that both said first satellite and the anticipated location of the second satellite lie within the scan plane of the antenna; and means for electronically scanning the beam of the antenna from said first satellite to said second satellite at said time of handoff to de-establish communication with the first satellite and establish communication with the second satellite.

15. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 14, which further includes:

means for receiving handoff information from said first satellite specifying the time at which handoff from the first to the second satellite will occur and the location of said second satellite at the time of handoff;

means for calculating the position of said first satellite at the time of handoff; and;

said means for physically positioning the antenna prior said handoff includes means for positioning the antenna so that both said calculated position of said first satellite and the location of the second satellite at the time of handoff lie within the scan plane of the antenna.

16. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 15, which further includes:

means for calculating from the received handoff information the vector direction from the antenna to the first satellite at the time of handoff and the vector direction to the second satellite at the time of handoff; and said means for physically positioning the antenna prior to said handoff includes means for positioning the antenna so that both said vector directions of said first and second satellites at the time of handoff lie within the scan plane of the antenna.

17. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 10, which further includes:

means for calculating from the vector direction from the antenna to the first satellite at the time of handoff and the vector direction to the second satellite at the time of handoff an intermediate vector direction comprising the sum of the other two vector directions; and said means for physically positioning the antenna prior to said handoff includes means for positioning the antenna so that both said vector directions of said first and second satellites at the time of handoff lie within the scan plane of the antenna and the boresight of the antenna points in the direction of said intermediate vector.

18. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 17, which further includes:

means for physically positioning the antenna just after the handoff to the second satellite so that the antenna boresight is in direct alignment with the second satellite.

19. A system for performing handoff of a communication signal between a first low earth orbit (LEO) satellite and a second LEO satellite with an antenna in which the beam thereof may be both physically scanned by moving the antenna and electronically scanned by changing the phase relationship between the antenna elements as set forth in claim 17, wherein:

said means for physically positioning the antenna prior to said handoff includes means for incremental and iterative movements of the antenna about each of a central rotational axis and a transverse tilting axis and the electronic scanning of the antenna beam.

20. A method of performing of handoff of a terminal from one satellite to another by an antenna which is capable of being both mechanically and electronically scanned, said method comprising:

tracking a first satellite with boresight pointing of the antenna by mechanical and or electronic scanning of the antenna to follow the satellite;

receiving information from the satellite as to next handoff time and the position of a second satellite at that handoff time;

calculating and predicting the position of the first satellite at said handoff time;

calculating a first vector from the antenna to the first satellite at said handoff time;

calculating a second vector from said antenna to said second satellite at said handoff time;

mechanically positioning said antenna so that both of said calculated vectors lie upon the electronic scan plane of said antenna;

scanning electronically from said first satellite to said second satellite at handoff time to establish communication with said second satellite; and beginning to track said second satellite with boresight pointing using mechanical scanning of said antenna.

21. A method as set forth claim 20 which includes the additional steps of:

calculating a third vector which defines an intermediate position between said first and second vectors;

calculating the mechanical angles through which said antenna must be rotated in order to point in the direction of said third vector; and iteratively moving said antenna while adjusting said beam scan angle to maintain communication with said first satellite while mechanically positioning said antenna in the direction of said third vector prior to electronically scanning from the first satellite to the second satellite.

22. A method as set forth claim 21 wherein:

said intermediate vector is calculated by summing the first and second vectors.

23. A system for performing handoff of a terminal from one satellite to another by an antenna which is capable of being both mechanically and electronically scanned, comprising:

means for tracking a first satellite with boresight pointing of the antenna by mechanical and or electronic scanning of the antenna to follow the satellite;

means for receiving information from the satellite as to next handoff time and the position of a second satellite at that handoff time;

means for calculating and predicting the position of the first satellite at said handoff time;

means for calculating a first vector from the antenna to the first satellite at said handoff time;

means for calculating a second vector from said antenna to said second satellite at said handoff time;

means for mechanically positioning said antenna so that both of said calculated vectors lie upon the electronic scan plane of said antenna;

means for scanning electronically from said first satellite to said second satellite at handoff time to establish communication with said second satellite; and means for beginning to track said second satellite with boresight pointing using mechanical scanning of said antenna.

24. A system as set forth claim 23 which also includes:

means for calculating a third vector which defines an intermediate position between said first and second vectors;

means for calculating the mechanical angles through which said antenna must be rotated in order to point in the direction of said third vector; and means for iteratively moving said antenna while adjusting said beam scan angle to maintain communication with said first satellite while mechanically positioning said antenna in the direction of said third vector prior to electronically scanning from the first satellite to the second satellite.

25. A system as set forth claim 24 wherein:

said intermediate vector is calculated by summing the first and second vectors.

26. A method for communicating with at least two communications nodes comprising:

providing an azimuth turntable mounted for rotational motion in either direction about a central axis;

providing an elevation table mounted upon said azimuth turntable for arcuate movement about a transverse axis which is perpendicular to said central axis, said upper surface of said table containing a plurality of antenna elements to form a phased array antenna in which the scan plane of said phased array lies in a plane which is substantially parallel to said transverse axis;

rotating said azimuth turntable about said central axis and arcuately moving said elevation table about said transverse axis until said phased array antenna elements mounted upon said elevation table are positioned so that two of said nodes with which said antenna is to communicate lie within the scan plane of said antenna elements; and electronically scanning the beam of the phased array antenna elements mounted upon said elevation table to be selectively directed to either one or the other of said two nodes.

27. A method as set forth in claim 26 wherein, one of said at least two nodes is a going satellite of a constellation and the other of said nodes is a coming satellite of said constellation and said antenna is used to perform a handoff of the communication channel from said going to said coming satellite, said method further comprising:

rotating said azimuth turntable about said central axis and arcuately moving said elevation table about said transverse axis until said phased array antenna elements mounted upon said elevation table are positioned so that the respective positions of said going and coming satellites at the moment of handoff lie within the scan plane of said antenna elements and the boresight of said antenna elements points in a direction intermediate the position of said two satellites; and electronically scanning the beam of the phased array antenna elements mounted upon said elevation table from said going satellite to said coming satellite at the moment of handoff.

28. A method as set forth in claim 26 wherein said antenna includes two sets of feed networks and two sets of electronics controlling two independent antenna beams, said antenna further comprising:

electronically scanning each of said two independent beams of the phased array antenna elements mounted upon said elevation table to follow separate ones of said two nodes.

29. A method as set forth in claim 26 wherein, one of said at least two nodes is a going satellite of a constellation and the other of said nodes is a coming satellite of said constellation and said antenna is used to perform a handoff of the communication channel from said going to said coming satellite, said method further comprising:

receiving handoff information from said going satellite indicating the time at which handoff is to be performed and the location of the coming satellite at the moment of handoff;

calculating from said handoff information the vector direction from said antenna to said going satellite at the moment of handoff and the vector direction of said coming satellite at the moment of handoff;

rotating said azimuth turntable about said central axis and arcuately moving said elevation table about said transverse axis until said phased array antenna elements mounted upon said elevation table are positioned so that the vector directions both said going and coming satellites at the moment of handoff lie within the scan plane of said antenna elements and the boresight of said antenna elements points in a direction intermediate the position of said two satellites; and electronically scanning the beam of the phased array antenna elements mounted upon said elevation table from said going satellite to said coming satellite at the moment of handoff.

30. A method as set forth in claim 29 wherein, one of said at least two satellites is a going satellite of a constellation and the other of said satellites is a coming satellite of said constellation and said antenna is used to perform a handoff of the communication channel from said going to said coming satellite, and which includes the additional steps of:

calculating from the vector direction from said antenna to said going satellite at the moment of handoff and the vector direction to said coming satellite at the moment of handoff, an intermediate vector direction which the sum of the two said vector directions;

rotating said azimuth turntable about said central axis and arcuately moving said elevation table about said transverse axis until said phased array antenna elements mounted upon said elevation table are positioned so that the boresight of said antenna elements points in the direction of said calculated intermediate vector just prior to electronically scanning said antenna beam from said going satellite to said coming satellite.

31. A method as set forth in claim 29 further including:

rotating said azimuth turntable about said central axis and arcuately moving said elevation table about said transverse axis immediately after handoff so that the boresight of said antenna elements points in a direction directly in alignment with said coming satellite to which the communication channel has just been handed off.

* * * * *

UNITED STATES PATENT AND TRADEMARK OFFICE
CERTIFICATE OF CORRECTION

PATENT NO. : 6,034,634
DATED : March 7, 2000
INVENTOR(S) : Ingmar Karlsson et al.

It is certified that error appears in the above-identified patent and that said Letters Patent is hereby corrected as shown below:

<u>Title page,</u>
Item [56], add,
-- U.S. PATENT DOCUMENTS
4,881,078     11/1989     Yamane et al.     342/155

FOREIGN PATENT DOCUMENTS
0 536 921     4/1993     EPO
2 253 520     9/1992     GB
WO 97/15092   4/1997     WIPO
0 579 407     1/1994     EPO

OTHER PUBLICATIONS
ISR for PCT/SE98/01922
  completed 01/25/99, Feb. 1, 1999, PCT
Standard Search Report for RS 100292 US
  completed on 03/03/98, March 6, 1998 EPO --

Signed and Sealed this

Second Day of April, 2002

*Attest:*

JAMES E. ROGAN
*Attesting Officer*  *Director of the United States Patent and Trademark Office*